United States Patent
Bourgeois et al.

(10) Patent No.: US 7,632,595 B1
(45) Date of Patent: Dec. 15, 2009

(54) COMPLIANT FUEL CELL SYSTEM

(75) Inventors: Richard Scott Bourgeois, Albany, NY (US); Sauri Gudlavalleti, Albany, NY (US)

(73) Assignee: General Electric Company, Niskayuna, NY (US)

( * ) Notice: Subject to any disclaimer, the term of this patent is extended or adjusted under 35 U.S.C. 154(b) by 304 days.

(21) Appl. No.: 10/816,697

(22) Filed: Apr. 5, 2004

(51) Int. Cl.
*H01M 8/04* (2006.01)

(52) U.S. Cl. .............................. 429/38; 429/34; 429/35; 429/39

(58) Field of Classification Search ........................ None
See application file for complete search history.

(56) References Cited

U.S. PATENT DOCUMENTS

| | | | | |
|---|---|---|---|---|
| 4,942,099 A | * | 7/1990 | Isobe et al. | 429/35 |
| 5,077,148 A | * | 12/1991 | Schora et al. | 429/16 |
| 5,378,247 A | * | 1/1995 | Sasaki et al. | 29/623.1 |
| 5,770,327 A | * | 6/1998 | Barnett et al. | 429/32 |
| 6,265,095 B1 | * | 7/2001 | Hartvigsen et al. | 429/32 |
| 6,492,053 B1 | * | 12/2002 | Donelson et al. | 429/34 |
| 2003/0059661 A1 | | 3/2003 | Gorbell et al. | |
| 2003/0077500 A1 | * | 4/2003 | Gorbell | 429/35 |

* cited by examiner

*Primary Examiner*—Patrick Ryan
*Assistant Examiner*—Tony Chuo
(74) *Attorney, Agent, or Firm*—Patrick K. Patnode (57) ABSTRACT

A fuel cell assembly comprising at least one metallic component, at least one ceramic component and a structure disposed between the metallic component and the ceramic component. The structure is configured to have a lower stiffness compared to at least one of the metallic component and the ceramic component, to accommodate a difference in strain between the metallic component and the ceramic component of the fuel cell assembly.

13 Claims, 8 Drawing Sheets

COMPLIANT FUEL CELL SYSTEM

STATEMENT REGARDING FEDERALLY SPONSORED RESEARCH OR DEVELOPMENT

The U.S. Government may have certain rights in this invention pursuant to contract number DE-FC26-01NT41245 awarded by the U.S. Department of Energy.

BACKGROUND OF THE INVENTION

This invention relates generally to fuel cells and more specifically to compliant fuel cell systems designed to accommodate strain in the fuel cell assemblies during thermal cycles.

A fuel cell produces electricity by catalyzing fuel and oxidant into ionized atomic hydrogen and oxygen at the anode and the cathode, respectively. The electrons removed from hydrogen in the ionization process at the anode are conducted to the cathode where they ionize the oxygen. In the case of a solid oxide fuel cell, the oxygen ions are conducted through the electrolyte where they combine with ionized hydrogen to form water as a waste product and complete the process. The electrolyte is otherwise impermeable to both fuel and oxidant and merely conducts oxygen ions. This series of electrochemical reactions is the sole means of generating electric power within the fuel cell. It is therefore desirable to reduce or eliminate any mixing of the reactants that results in a different combination such as combustion which does not produce electric power and therefore reduces the efficiency of the fuel cell.

The fuel cells are typically assembled in electrical series in a fuel cell stack to produce power at useful voltages. To create a fuel cell stack, an interconnecting member is used to connect the adjacent fuel cells together in electrical series. When the fuel cells are operated at high temperatures, such as between approximately 600° C. (Celsius) and 1000° C., the fuel cells are subjected to mechanical and thermal loads that may create strain and resulting stress in the fuel cell stack. Typically in a fuel cell assembly, various elements in intimate contact with each other comprise different materials of construction, such as a metal and a ceramic. During the thermal cycles of the fuel cell assembly, elements expand and/or contract in different ways due to the difference in the coefficient of thermal expansion (CTE) of the materials of construction. In addition, individual elements may undergo expansion or contraction due to other phenomena, such as a change in the chemical state of one or more elements. This difference in dimensional expansion and/or contraction may affect the seal separating the oxidant and the fuel paths and also the bonding of the elements made of dissimilar materials.

Therefore there is a need to design a fuel cell assembly that is compliant to changes in operating states including temperature cycles and changes in chemical state. Furthermore to preserve the mechanical integrity of the fuel cell assembly, the compliant fuel cell assembly needs to be designed in such a way that any expansion in the fuel cell assembly at high temperatures does not create stress in the fuel cell assembly.

BRIEF DESCRIPTION OF THE INVENTION

In one aspect, a fuel cell assembly comprises at least one metallic component, at least one ceramic component and a structure disposed between the metallic component and the ceramic component. The structure is configured to have a lower stiffness compared to at least one of the metallic component and the ceramic component to accommodate a difference in strain between the metallic component and the ceramic component of the fuel cell assembly.

In another aspect, a fuel cell assembly comprises at least one hollow manifold comprising a wall extending between a first end and a second end, wherein the wall defines a chamber therein. The wall comprises at least one opening extending therethrough in flow communication with the chamber. The fuel cell assembly further comprises a fuel cell comprising an anode, a cathode and an electrolyte disposed therebetween and disposed on the wall. A portion of the wall immediately adjacent to the fuel cell is configured to have a lower stiffness compared to at least one of the fuel cell and the wall to accommodate a strain between the fuel cell and the wall.

In yet another aspect, a fuel cell stack comprises a first fuel cell assembly and a second fuel cell assembly electrically coupled together such that at least one sealed passage extends between the first and the second fuel cell assemblies. The first and second fuel cell assemblies each comprise at least one hollow manifold comprising a wall extending between a first end and a second end, the wall defining a chamber therein. The wall comprises at least one opening extending therethrough in flow communication with the chamber. Each of the first and second fuel cell assemblies further comprises a fuel cell comprising an anode, a cathode and an electrolyte disposed therebetween. The cell is disposed on the wall, wherein a portion of the wall immediately adjacent to the fuel cell and the sealed passage are configured to have a lower stiffness compared to at least one of the fuel cell and the sealed passage to accommodate a strain between the fuel cell, the wall and the sealed passage.

In yet another aspect, a fuel cell assembly comprises a first component comprising a first material and a second component comprising a second material. The fuel cell assembly further comprises a structure disposed between the first component and the second component to accommodate a strain therebetween. The coefficient of thermal expansion of the first component is greater than the coefficient of thermal expansion of the second component.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figures 1, 1A:
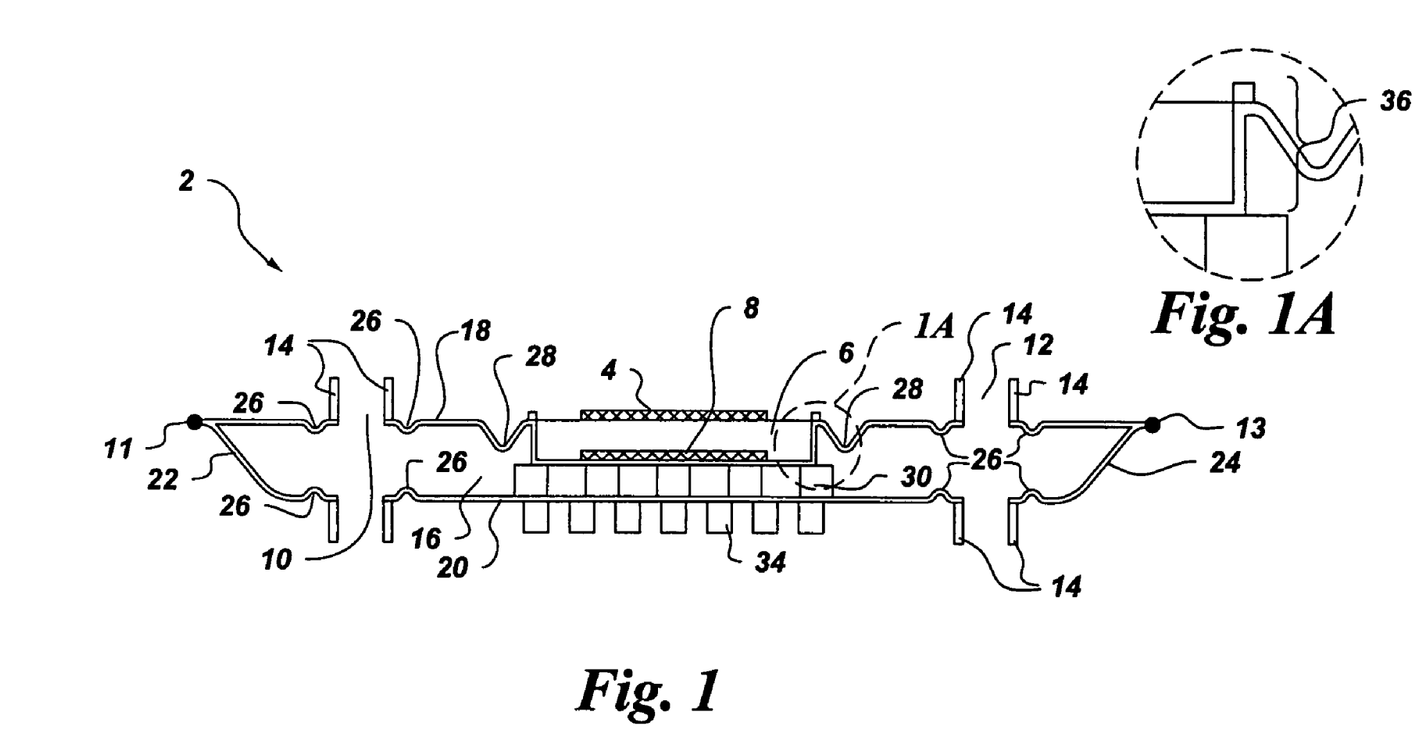
FIG. 1 illustrates a side view of an exemplary compliant fuel cell assembly with a hollow manifold.

Fuel cells, such as solid oxide fuel cells, have demonstrated a potential for high efficiency and low pollution in power generation. A fuel cell is an energy conversion device that produces electricity by electrochemically combining a fuel and an oxidant across an ionic conducting layer. Fuel cells may have planar or tubular configurations. Fuel cells may be stacked together either in series or in parallel to construct the fuel cell architecture, capable of producing a resultant electrical energy output. FIG. 1 illustrates a side view of an exemplary fuel cell assembly 2. The fuel cell assembly 2 comprises a fuel cell 36 comprising an anode 8, a cathode 4 and an electrolyte 6 disposed therebetween. The fuel cell 36 is disposed on a hollow manifold 16, which hollow manifold 16 is configured to distribute fuel to the anode 8. The hollow manifold 16 comprises at least one wall extending between a first end 11 and a second end 13, said wall defining a chamber therein, said wall comprising at least one opening extending there through in flow communication with said chamber. The hollow manifold 16 includes a top wall 18 and a bottom wall 20. The hollow manifold 16 further comprises an inlet hollow passage 10 for the fuel introduction and an exit hollow passage 12 for the fuel exit. The fuel inlet passage 10 and the fuel exit passage 12 are typically defined by a hollow electrical insulator (nor shown) that may be fabricated from, but is not limited to, a ceramic material. In one embodiment, the insulator is coupled to manifold 16 using seals 14 that may be fabricated from, but are not limited to, a glass or a glass ceramic material. The adjacent area on the top wall 18, which adjacent area is in intimate contact with the fuel cell 36, is configured to have a compliant structure 28 to accommodate expansion in the plane of the fuel cell assembly 2 during the thermal cycles of the fuel cell assembly 2. The adjacent areas on the top wall 18 in intimate contact with the seals 14 of the inlet fuel passage 10 and exit fuel passage 12 are also configured to have a compliant structure 26 to accommodate expansion in the plane of the fuel cell assembly 2 during the thermal cycle.

In the exemplary fuel cell assembly 2, such as the solid oxide fuel cell (SOFC), oxygen ions ($O^{2-}$) generated at the cathode are transported across the electrolyte interposed between the anode and the cathode. The fuel, for example natural gas, is fed to the anode. The fuel at the anode reacts with oxygen ions ($O^{2-}$) transported to the anode across the electrolyte. The oxygen ions ($O^{2-}$) combine with hydrogen ions ($H^+$) to form water ($H_2O$). The electrons removed from hydrogen in the ionization process at the anode are conducted to the cathode where they ionize the oxygen. The electron flow thus produces direct current electricity across the external electric circuit.

In the exemplary embodiment as shown in FIG. 1, the fuel cell assembly 2 comprises a single fuel cell 36 having a planar configuration, although multiple such fuel cells may be provided in a single structure, which structure may be referred to as a stack or a collection fuel cell assemblies. The fuel cell may be one of solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells. The fuel cell 36 comprises a cathode 4, an anode 8 and an electrolyte 6 disposed between the anode 8 and the cathode 4. An oxidant flows in the cathode side of the fuel cell 36 and a fuel flows in the anode side of the fuel cell 36.

The main purpose of the anode 8 is to provide reaction sites for the electrochemical oxidation of a fuel introduced into the fuel cell. In addition, the anode material should be stable in the fuel-reducing environment, have adequate electronic conductivity, surface area and catalytic activity for the fuel gas reaction at the fuel cell operating conditions and have sufficient porosity to allow gas transport to the reaction sites. The anode 8 can be made of a number of materials having these properties, including but not limited to, metal, Ni, Ni Alloy, Ag, Cu, Noble metals, Cobalt, Ruthenium, Ni-YSZ cermet, Cu-YSZ cermet, Ni-Ceria, cermet, ceramics or combinations thereof.

The electrolyte 6 is disposed upon the anode 8. The main purpose of the electrolyte layer is to conduct ions between the anode 8 and the cathode 4. The electrolyte carries ions produced at one electrode to the other electrode to balance the charge from the electron flow and complete the electrical circuit in the fuel cell. Additionally, the electrolyte separates the fuel from the oxidant in the fuel cell. Accordingly, the electrolyte is designed to be stable in both the reducing and oxidizing environments, impermeable to the reacting gases and adequately conductive at the operating conditions. Typically, the electrolyte 6 is substantially electronically insulating. The electrolyte 6 can be made of a number of materials having these properties, including but not limited to, $ZrO_2$, YSZ, doped ceria, $CeO_2$, Bismuth sesquioxide, pyrochlore oxides, doped zirconates, perovskite oxide materials and combinations thereof.

The electrolyte layer 6 has a thickness such that electrolyte is substantially gas impermeable. The thickness of the electrolyte 6 is typically less than 50 microns, preferably in the range between about 0.1 microns thick to about 10 microns, and most preferably in the range between about 1 microns thick to about 5 microns thick.

The cathode layer 4 is disposed upon the electrolyte 6. The main purpose of the cathode 4 is to provide reaction sites for the electrochemical reduction of the oxidant. Accordingly, the cathode 4 is designed to be stable in the oxidizing environment, have sufficient electronic conductivity, surface area and catalytic activity for the oxidant gas reaction at the fuel cell operating conditions and have sufficient porosity to allow gas transport to the reaction sites. The cathode 4 can be made of a number of materials having these properties, including but not limited to, an electrically conductive oxide, perovskite, doped LaMnO3, Sr-doped LaMnO4 (LSM), tin doped Indium Oxide (In2O3), Strontium-doped PrMnO3, LaFeO3-LaCoO3 RuO2-YSZ, La Cobaltite, and combinations thereof.

During its service life, the temperature of a fuel cell, such as a solid oxide fuel cell, may be cycled several times between room temperature in the shut down state and operating temperatures of as high as 1000° C. During the thermal cycle in a fuel cell assembly, the elements in the fuel cell assembly including, but not limited to the anode, the cathode and the interconnects undergo thermal expansion and contraction as per the thermal coefficient of expansion of the individual materials. When there is a difference in the thermal coefficient of expansion in the elements of a fuel cell assembly, which elements are in intimate contact with each other, the fuel cell assembly is under mechanical stress. As used herein, "intimate contact" will be understood to generally imply a physical proximity of the elements of a fuel cell assembly, such as electrodes and the interconnects and includes an exemplary configuration wherein the electrodes are disposed on the interconnects. Typically, in a fuel cell assembly, at least one component of the fuel cell assembly is a metallic component and at least one component is a ceramic component. In operation, when the metallic component is in intimate contact with the ceramic component, due to the difference between the coefficients of thermal expansion of the metallic component and the ceramic component, the two components constrain each others' thermal expansion, thus resulting in mechanical stress in both the ceramic and metallic components. A compliant structure disposed in between the metallic component and the ceramic component is configured to make the fuel cell assembly compliant, as in the presence of the compliant structure, the metallic component and the ceramic component can expand freely, unconstrained by each other. In a substantially planar solid oxide fuel cell assembly, at least one electrode of the fuel cell is bonded or sealed to a metallic interconnect. The top surface of the metal interconnect is typically a thin sheet of metal. In operation, during the thermal cycle of the fuel cell assembly, due to the difference in the coefficient of thermal expansion of the electrode and the metallic interconnect the fuel cell assembly may be subjected to mechanical stress, which stress in turn may damage the fuel cell.

A compliant structure disposed between the metallic component and the ceramic component of a fuel cell assembly is configured to have a lower stiffness compared to stiffness of at least one of the metallic component and the ceramic component. The lower stiffness of the compliant structure accommodates any mechanical strain in the fuel cell assembly arising due to the difference in the rate of expansion in the metallic component and the ceramic component. In one embodiment, the compliant structure is configured to have a lower stiffness compared to the stiffness of both the ceramic and the metallic component. In one embodiment, as shown in FIG. 1, the compliant structures 28 and 26 are integral part of the top wall 18 of the hollow manifold 16. In this embodiment, a portion of the top wall 18 adjacent to the fuel cell 36 is corrugated to form the compliant structure 28. Similarly portions of the top wall 18 adjacent to the inlet fuel passage 10 and exit fuel passage 12 are corrugated to form the compliant structures 26. In some other embodiments, the compliant structures 28 and 26 comprise separate corrugated structures coupled to the top wall 18.

Returning back to FIG. 1, the top wall 18 is in intimate contact with the fuel cell 36 and the seal 14 for the inlet fuel passage 10 and the exit fuel passage 12. Similarly the bottom wall 20 of the hollow manifold 16 is in intimate contact with the seal 14 for the inlet fuel passage 10 and the exit fuel passage 12. The hollow manifold 16 is fabricated from an electrically conductive material, which conductive materials are capable of operating at higher temperatures as described herein, such as, but not limited to, stainless steel. Therefore, in the fuel cell assembly 2, as illustrated in FIG. 1, the top wall 18 of the hollow manifold 16 acts as an anode interconnect. Some of the functions of a typical interconnect in a planar fuel cell assembly are to provide electrical contact between individual components of the fuel cell assembly, provide fuel and oxidant flow passages and provide structural support. In the top wall 18, the compliant structure 28 in the area adjacent to the fuel cell 36 and the compliant structure 26 in the area adjacent to the inlet fuel passage 10 and exit fuel passage 12 may be achieved by stamping the top wall 18. Similarly the compliant structure 26 on the bottom wall 20 in the areas adjacent to the inlet fuel passage 10 and exit fuel passage 12 may be achieved by stamping the bottom wall 20. In one embodiment, the compliant structure is a corrugated structure, wherein the corrugation is achieved by this stamping process and is "V" shaped as illustrated in FIG. 1. The compliant structure 28 on the top wall 18 extends around the entire perimeter of the fuel cell 36. The compliant structure 28 serves as an expansion joint to accommodate differences in thermal expansion coefficients between the fuel cell 36 and the top wall 18, which top wall 18 acts as an anode interconnect. Therefore the fuel cell 36 is free to expand independently of top wall 18 while keeping an electrical contact with it. In operation, the compliant fuel cell assembly 2, as disclosed herein, advantageously provide a solution to the problems associated with the thermal cycles of the fuel cell assembly 2. The compliant structures 28 and 26 reduce the stresses in the components and joints in the fuel cell assembly 2, thus allowing for more optimal design, and increase the reliability of the fuel cell assembly 2.

Returning to FIG. 1, the hollow manifold 16 further comprises a pair of sidewalls 22 and 24 that connect the top and bottom walls 18 and 20, respectively. In one embodiment as illustrated in FIG. 1, the hollow manifold 16 is non-rectangular in shape, wherein the sidewalls 22 and 24 extend obliquely between top and bottom walls 18 and 20, respectively. In some embodiments, the hollow manifold 16 comprises channels 30 for guiding the fuel flow inside the hollow manifold 16. The top wall 18 of the hollow manifold 16 comprises at least one opening (not shown) to provide a flow communication between the fuel flowing through the hollow manifold 16 and the anode 8 disposed on the top wall 18. The hollow manifold 16 further comprises a series of dividers 34 disposed on the bottom wall 20. The dividers 34 may act as a cathode interconnect and provide a passage for oxidants when fuel cell assembly 2 is connected in electrical series to other fuel cell assemblies in a fuel cell stack. For the purpose of understanding, a fuel cell stack is defined herein as a system, wherein a plurality of the fuel cell assemblies are joined typically in electrical series. This definition of a fuel cell stack includes both the planar and the tubular configuration of the fuel cell assemblies.

Figure 2:
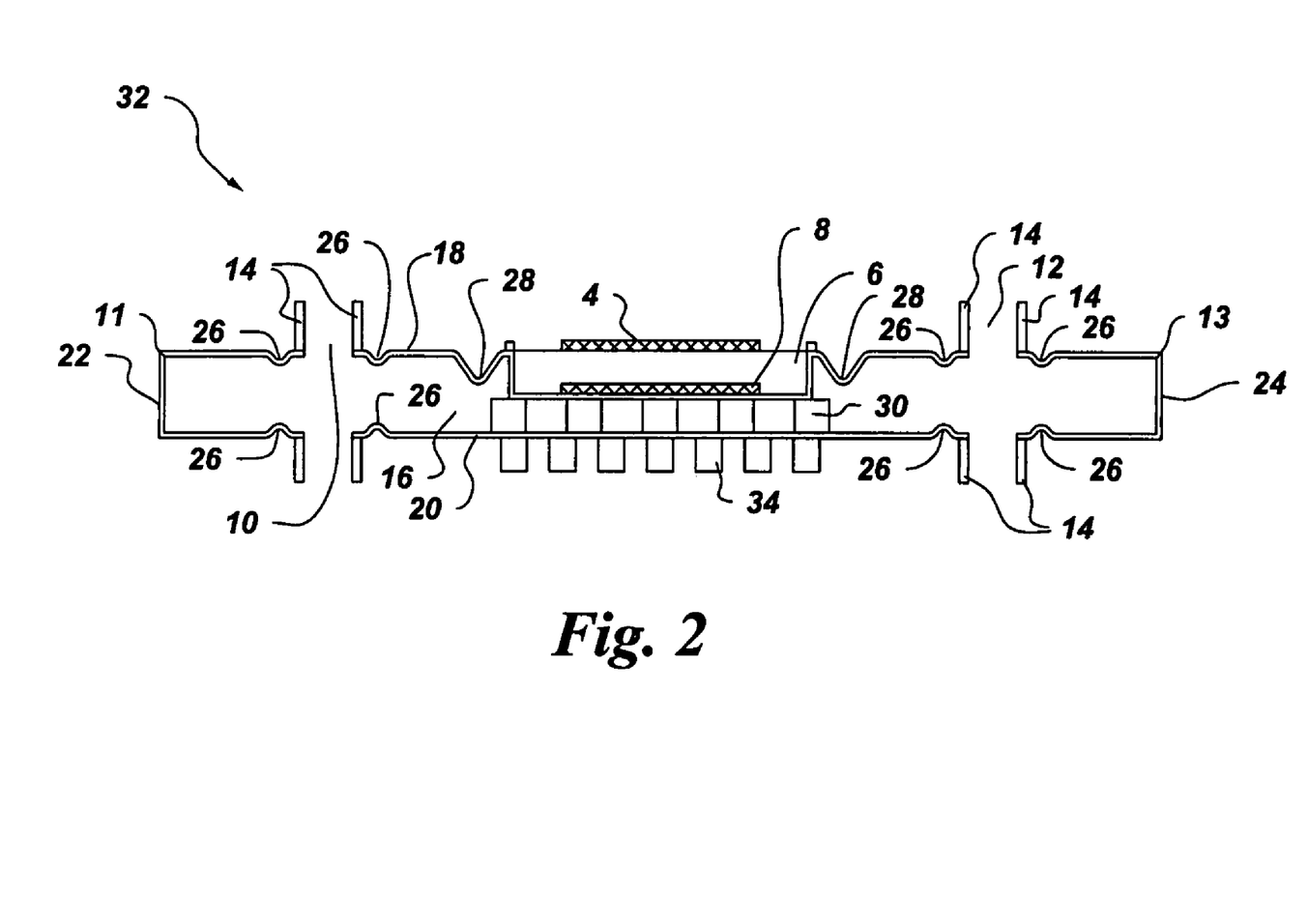
FIG. 2 illustrates a side view of yet another exemplary compliant fuel cell assembly with a hollow manifold.

FIG. 2 illustrates yet another exemplary compliant fuel cell assembly 38, wherein like features are represented by like numerals. The fuel cell assembly 32 comprises a manifold 16, which hollow manifold 16 is substantially rectangular, and sidewalls 22 and 24 extend substantially perpendicularly between top wall 18 and bottom wall 20.

Figure 3:
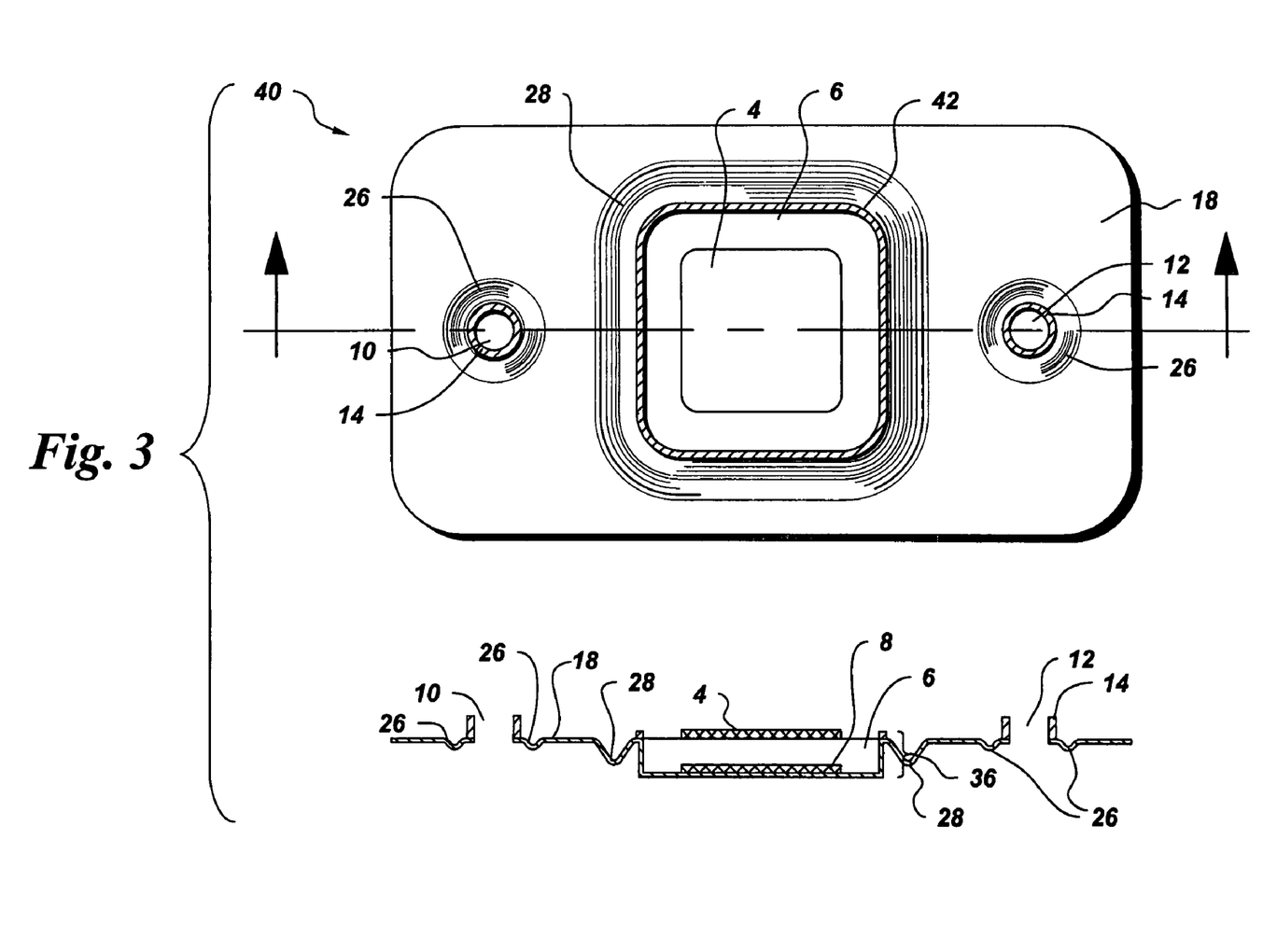
FIG. 3 illustrates a top and a side view of an exemplary top wall of the hollow manifold as illustrated in FIG. 1 and FIG. 2.

FIG. 3 illustrates a top and a sectional side view of the top wall 18 of an exemplary fuel cell assembly 2 as described in the earlier sections. The fuel cell 36 comprises an anode 8, a cathode 4 and an electrolyte disposed therebetween, which cell is bonded to the top wall 18 using a bond paste 42. The anode 8 is disposed on the top wall 18. The electrolyte 6 is disposed on the anode 8 and the cathode 4 is disposed on the electrolyte 6. Specifically, electrolyte 6 is formed to have a surface area that is at least co-extensive with, or greater than a surface area of anode 8, such that the electrolyte 6 is bonded directly to at least a portion of top wall 18. In the exemplary embodiment, as shown in FIG. 3, electrolyte 6 has a surface area that is greater than the surface area of the anode 8. The area on the top wall 18 adjacent to the fuel cell 36 is configured to have a compliant structure 28 to accommodate any expansion during the thermal cycle of the fuel cell. The top wall 18 further comprises the inlet fuel passage 10 and exit fuel passage 12. The hollow fuel passages 10 and 12 comprise an electrical insulator (not shown) which insulator is coupled to the top wall 18 using a seal 14. The adjacent areas on the top wall 18, which areas are in intimate contact with the seals 14 of the inlet fuel passage 10 and exit fuel passage 12, are also configured to have a compliant structure 26 to accommodate an expansion in the plane of the fuel cell assembly 2 during the thermal cycle. Typically the materials of construction of the fuel cell 36 and the top wall 18 are different. Therefore, in operation, during the thermal cycle of the fuel cell, the change in dimensions of the fuel cell 36 and the top wall 18 are different due to the difference in the CTE. This difference in CTE may damage the mechanical integrity of the fuel cell.

The compliant structures 26 and 28, which structures may have corrugations in the top wall keeps the mechanical integrity of the fuel cell as any expansion in the plane of the fuel cell during thermal cycle is accommodated. In one embodiment, the compliant structures 26 and 28 are configured to have corrugations that are "V" shaped or sinusoidally shaped.

Figure 4:
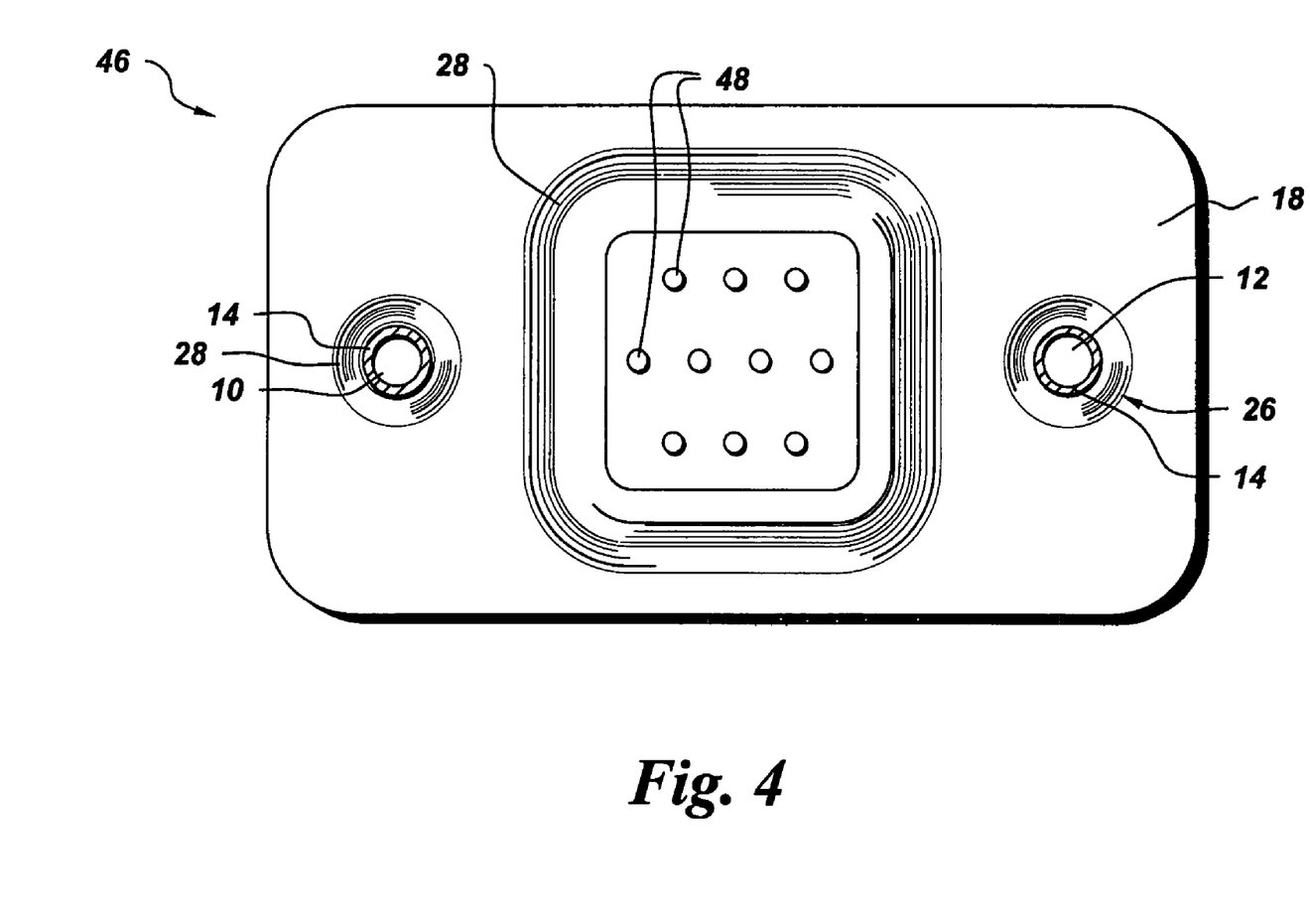
FIG. 4 illustrates a top view of an exemplary top wall of the hollow manifold as illustrated in FIG. 1 and FIG. 2.

FIG. 4 is a top view 46 of the top plate 18 of the hollow manifold 16 as shown in FIG. 1 without the fuel cell 36 disposed on it. The compliant structure 28 is in the adjacent area to the fuel cell 36 (not shown), and the compliant structure 26 is in the adjacent area to the inlet and exit fuel passage 10 and 12 respectively. The top wall 18 further comprises at least one opening 48, which opening 48 is in fluid communication with the anode (not shown). More specifically, in the exemplary embodiment as shown in FIG. 4, a plurality of openings 48 extend through the top wall 18 into the chamber of the hollow manifold 16. In the exemplary embodiment, openings 48 are arranged in a substantially collinear configuration, i.e., openings 48 are arranged in a plurality of rows. Each row includes a plurality of openings 48 arranged in a linear sequence. Additionally, in the exemplary embodiment, each opening 48 has a substantially circular cross-sectional profile. In some other embodiments, each opening 48 has a non-circular cross-sectional profile.

Figure 5:
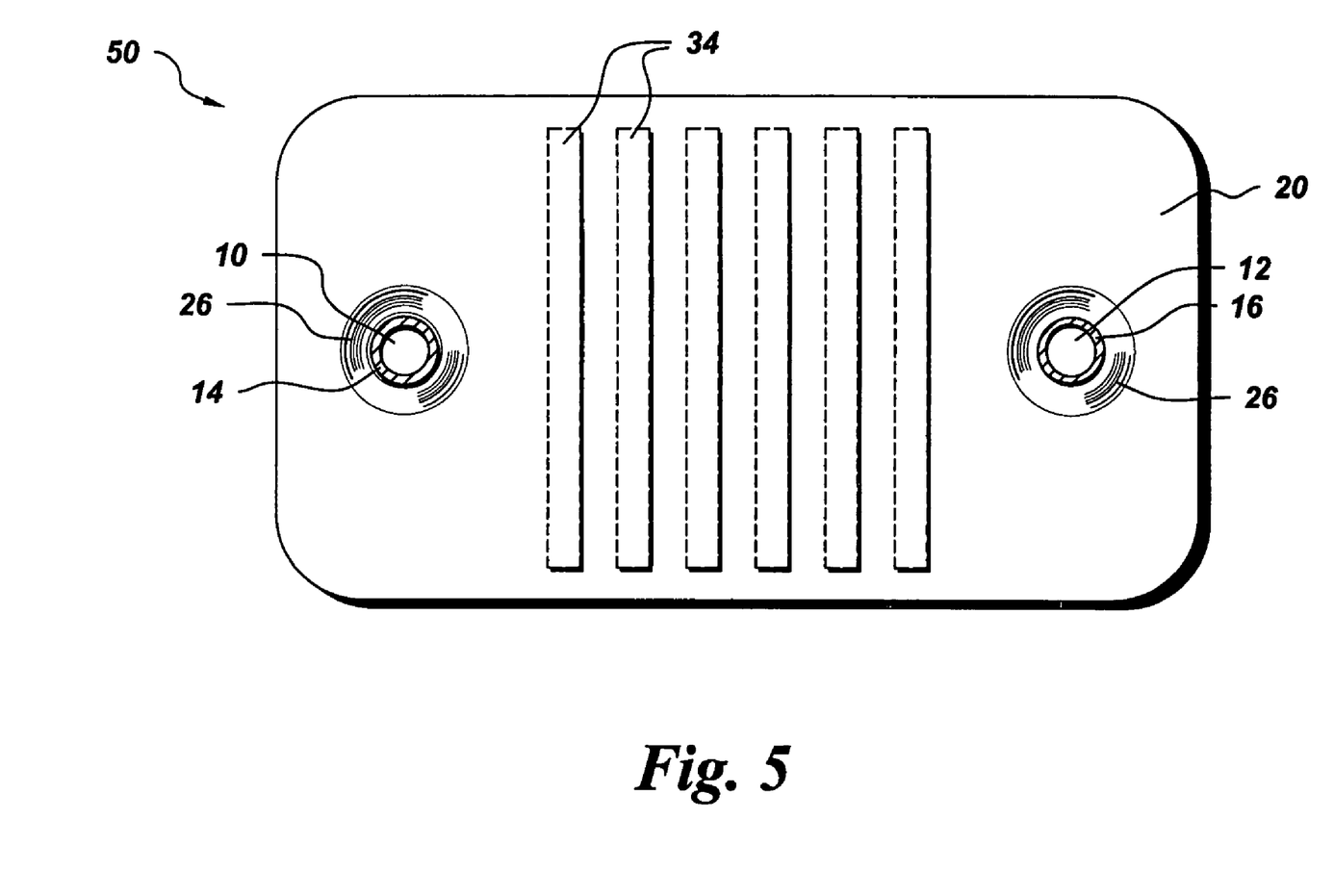
FIG. 5 illustrates a top view of an exemplary bottom wall of the hollow manifold as illustrated in FIG. 1 and FIG. 2.

FIG. 5 shows a top view 50 of the bottom wall 20 of the hollow manifold 16 as shown in FIG. 1. The bottom wall 20 comprises two openings for inlet and exit fuel passages 10 and 12 respectively. The adjacent area of the inlet and exit fuel passages 10 and 12 have compliant structure 26 to accommodate the expansion in the plane of the fuel cell during thermal cycles. The bottom wall 20 further comprises a series of divider 34 disposed on the bottom wall 20. The dividers 34 may act as a cathode interconnect and provides a passage for oxidants when fuel cell assembly 2 is connected to a series on other fuel cells in a fuel cell assembly.

Figure 6:
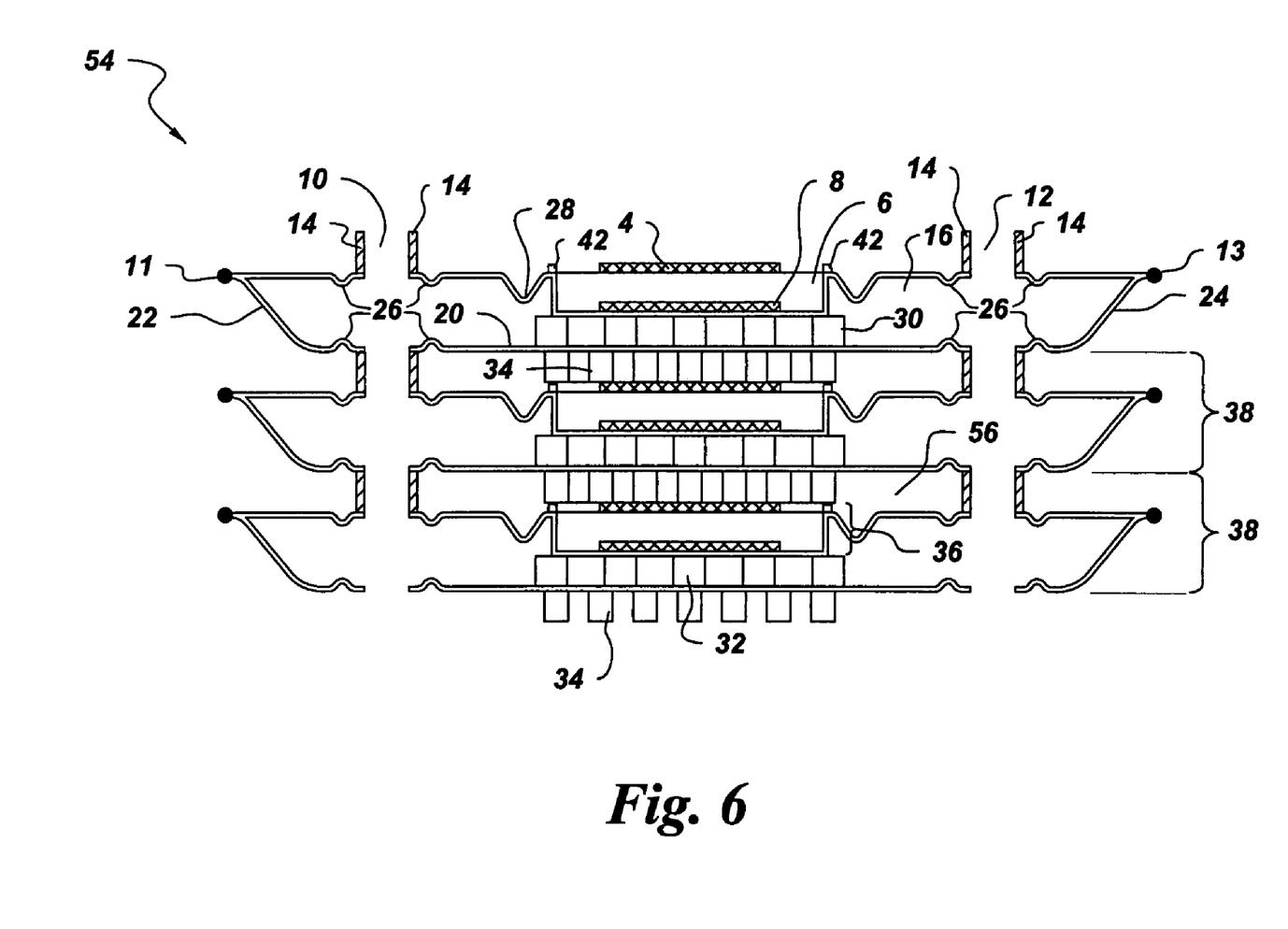
FIG. 6 illustrates an exemplary compliant fuel cell stack.

FIG. 6 illustrates a cross-sectional view of an exemplary compliant fuel cell stack 54 that comprises a plurality of repeating units 38. Each repeating unit 38 comprises the fuel cell 36, the cathode interconnect 34 and the hollow manifold 16. Hollow manifold 16 acts as the anode interconnect. The fuel cell 36 in each repeating unit comprises an anode 8, a cathode 4 and an electrolyte 6 disposed therebetween. The fuel cell 36 is disposed on the hollow manifold 16, which hollow manifold is configured to distribute fuel to the anode 8. The hollow manifold 16 includes a wall extending between a first end 11 and a second end 13 defining a chamber therein. The hollow manifold includes a top wall 18 and a bottom wall 20. The hollow manifold 16 further comprises an inlet hollow passage 10 for fuel introduction and an exit hollow passage 12 for fuel exit. The fuel inlet passage 10 and fuel exit passage 12 are typically defined by a hollow electrical insulator (nor shown) that may be fabricated from, but is not limited to, a ceramic material. In one embodiment, the insulator is coupled to manifolds 16 using seals 14 that may be fabricated from, but are not limited to, a glass or a glass ceramic material. The adjacent area of the fuel cell 36 in contact with the top wall 18 is configured to have a compliant structure 28 to accommodate expansion in the plane of the fuel cell assembly 2 during the thermal cycles of the fuel cell assembly 2. The adjacent areas on the top wall 18 are in intimate contact with the seals 14 of the inlet fuel passage 10 and exit fuel passage 12, are also configured to have a compliant structure 26 to accommodate the expansion in the plane of the fuel cell assembly 2 during the thermal cycle.

As illustrated in FIG. 6, the hollow manifold 16 further comprises a pair of sidewalls 22 and 24 that connect the top and bottom walls 18 and 20, respectively. In one embodiment as illustrated in FIGS. 1 and 6, the hollow manifold 16 is non-rectangular, wherein the sidewalls 22 and 24 extend obliquely between top and bottom walls 18 and 20, respectively. In the exemplary embodiment, as illustrated in FIG. 6, the manifolds 16 are each sized identically. In some embodiments, the hollow manifold 16 comprises channels 30 for guiding the fuel flow inside the hollow manifold 16. The top wall 18 of the hollow manifold 16 comprises at least one opening (not shown) to provide a flow communication between the fuel flowing through the hollow manifold 16 and the anode 8 disposed on the top wall 18. The hollow manifold 16 further comprises a series of dividers 34 disposed on the bottom wall 20. The dividers 34 may act as a cathode interconnect and provide a passage 56 for oxidants for the next repeating unit 38. Such dividers 34 are configured such that when repeating units are assembled in a stacked arrangement, dividers 34 conduct electricity from an anode 8 of one repeating unit 38 to a cathode 4 of an adjacent repeating unit 38. In an exemplary embodiment, dividers 34 are fabricated from an electrically conductive material, such as, but not limited to, conductive materials capable of operating at higher temperatures as described herein, such as, but not limited to, stainless steel. In one embodiment, dividers 34 are formed integrally with bottom wall 20 of the hollow manifold 16.

In operation, as described in more detail below, when a fuel enters the manifold 16 through the fuel inlet passage 10, fuel flow is channeled through the hollow manifold 16 and contacts the anode 8 through the openings 48 (as shown in FIG. 4). Fuel flow is then discharged from the hollow manifold 16 through fuel exit passage 12.

A fuel such as, hydrogen and/or a hydrocarbon which is reformed either within the fuel cell stack 54 or is pre-reformed is supplied to fuel cell stack 54 through the fuel inlet passage 10. A pre-reformed fuel is defined as a mixture comprising hydrogen, carbon dioxide and carbon monoxide. Fuel and oxidant react in each repeating unit 38, which repeating units 38 are connected in series within the stack 54, to build voltage to useful levels. More specifically, the fuel reacts electrochemically with oxygen supplied to the stack 54 to generate direct current (DC) electricity with water as the main product. An oxidant, surrounding the stack 54, flows over the cathode 4 and is channeled through the dividers 34 that function as a cathode interconnect. In one embodiment, the stack 54 is arranged such that the directions of reactant flowing through the adjacent hollow manifolds 16 are substantially parallel and in opposite flow directions. In another embodiment, the stack 54 is arranged such that the directions of reactant flowing through the adjacent manifolds 16 are substantially parallel and in the same flow direction. In another embodiment, hollow manifolds 16 are arranged within the stack 54 such that the directions of reactant flowing through the adjacent hollow manifolds 16 are substantially perpendicular to each other.

When the repeating units 38 are stacked together, oxidant surrounds stack 54 and is channeled through stack 54 through flow area openings 56. To isolate fuel flowing through stack 54 from the oxidant surrounding and flowing through stack 54, the electrolyte 6 is deposited such that anode 8 is overlapped, and the electrolyte 6 is sealed directly to the top wall 18 of the hollow manifold 16.

Figure 7:
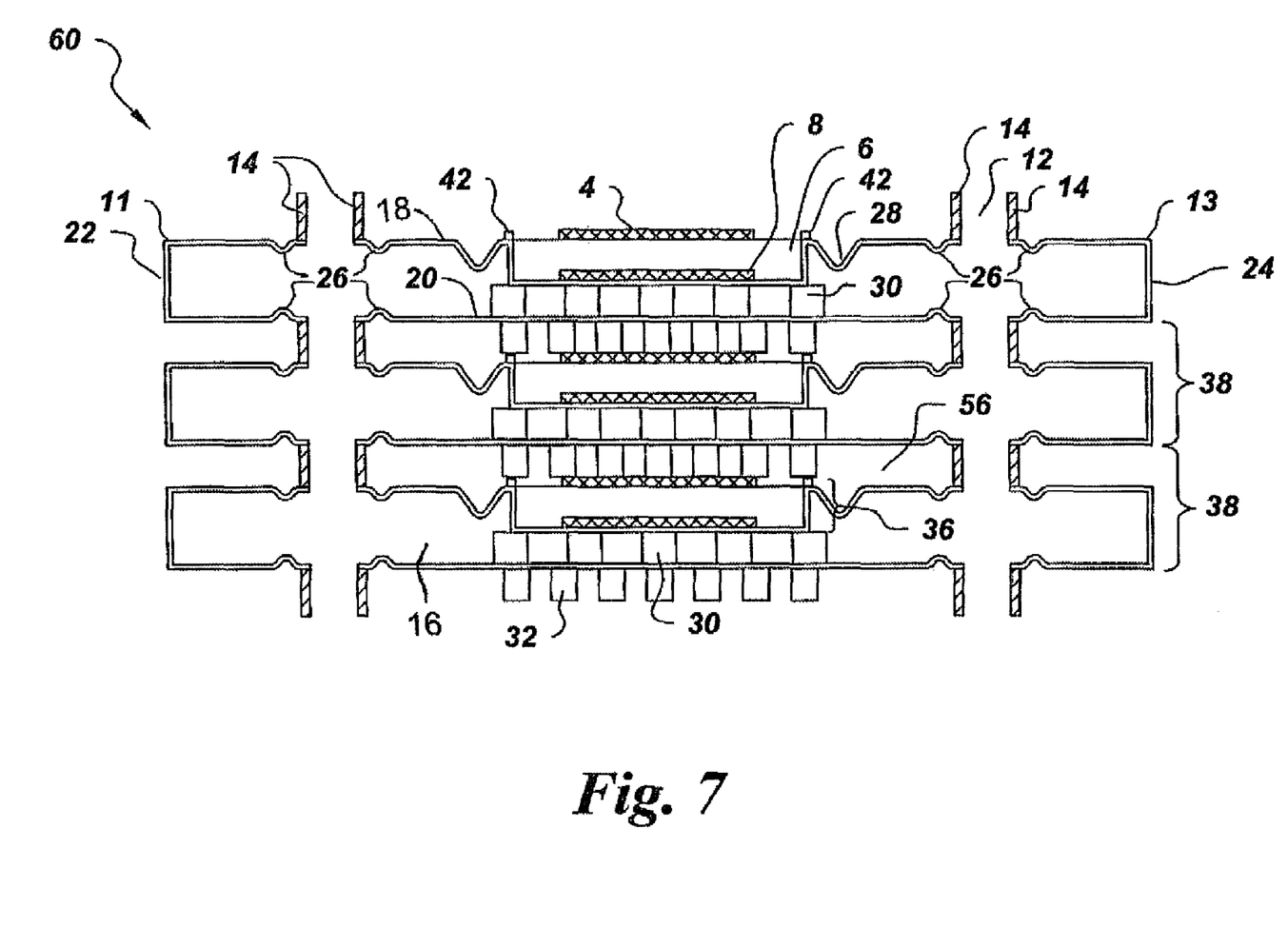
FIG. 7 illustrates yet another exemplary compliant fuel cell stack.

FIG. 7 illustrates a cross-sectional view of yet another exemplary compliant fuel cell stack 60 that comprises a plurality of repeating units 38. Each repeating unit 38 comprises the fuel cell 36, the cathode interconnect 32 and the hollow manifold 16. The hollow manifold 16 is substantially rectangular, and sidewalls 22 and 24 extend substantially perpendicularly between top wall 18 and bottom wall 20.

Exemplary embodiments of fuel cell assemblies and stacks are described above in detail. The fuel cell assemblies are not limited to the specific embodiments described herein, but rather, components of each assembly may be utilized independently and separately from other components described herein. Each fuel cell assembly component can also be used in combination with other fuel cell stack components. For example, in certain embodiments, the relative positions of the anode and the cathode within the stack may be exchanged, and similarly passages defined for fuel flow and oxidant may also be exchanged.

The compliant fuel cell system disclosed here is further illustrated in the following non-limiting example.

EXAMPLE

Figure 8:
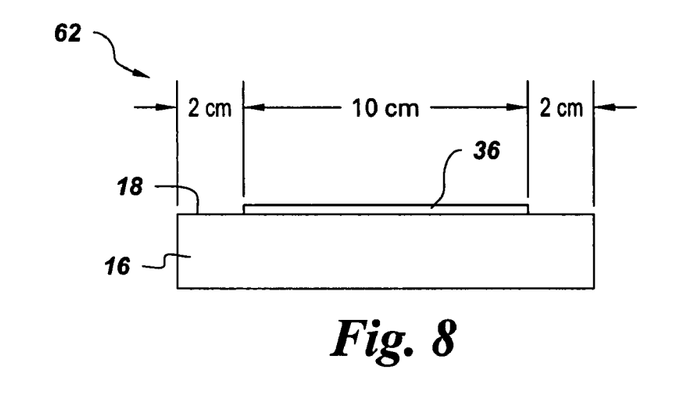
FIG. 8 illustrates an exemplary fuel cell assembly for analytical calculation.
Figure 9:
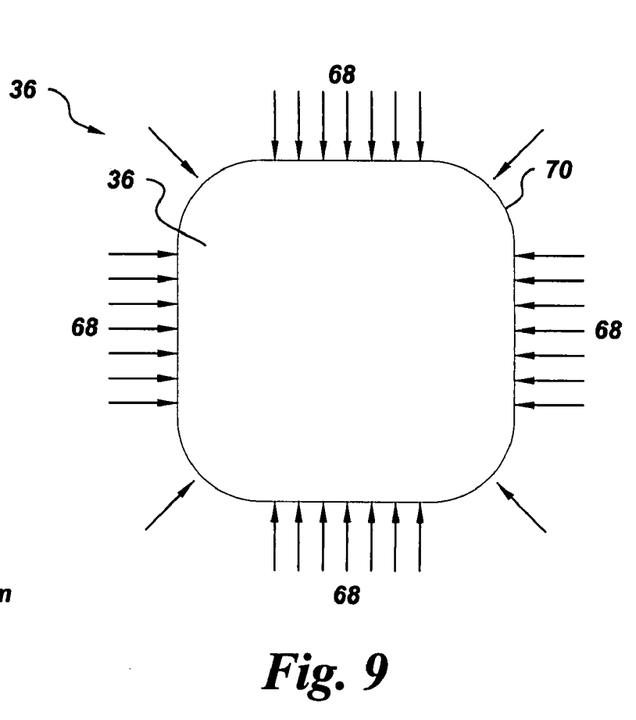
FIG. 9 illustrates an exemplary fuel cell.
Figure 10:
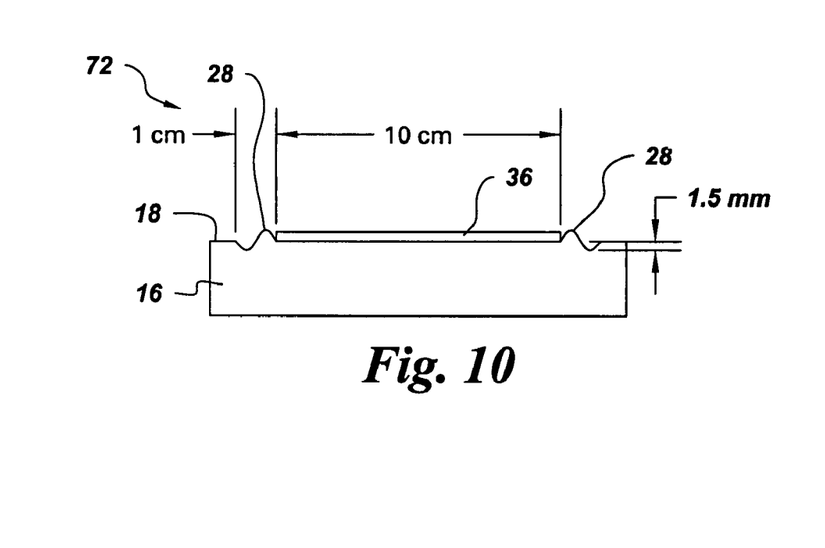
FIG. 10 illustrates yet another an exemplary fuel cell assembly for analytical calculation.

An analytical calculation was done on a fuel cell assembly as described herein. A fuel cell comprises a planar ceramic cell package in the size 10 cm×10 cm inset in a larger planar metallic interconnect plate. The arrangement 62 of the planar ceramic cell package, used for the purpose of this calculation is illustrated in FIG. 8. The fuel cell 36 is disposed on the interconnect 16. The ceramic fuel cell 36 may typically have a coefficient of thermal expansion (CTE) of 12.5 micron/meter/° C. The metallic interconnect top wall 18 may typically have a CTE of 9.9 micron/meter/° C. When such a fuel cell is assembled at room temperature and heats up to 700° C. during operation, this induces a thermal expansion mismatch, with the unrestrained thermal expansion of the ceramic cell 0.2 mm greater than the expansion in the interconnect. The interconnect may typically extend beyond the cell by 2 cm as illustrated in FIG. 8. Stains develop because the expansions are in fact restrained by the intimate contact between the ceramic component 36 and the metallic component 18. When the stiffness calculations are done for the interconnect without any corrugation, the stiffness of the interconnect results in a compressive forces as high as 500 N per millimeter along the circumference of the cell. FIG. 9 illustrates a diagrammatical view of the fuel cell 36 under the compressive force 68 along the circumference 70. FIG. 10 illustrates the arrangement 72 of the planar ceramic cell package, wherein the fuel cell 36 is disposed on the interconnect top wall 18. When a sinusoidally shaped corrugation structure 28 which is 1.5 mm deep and 1 cm in length is stamped on the interconnect, analytical calculations indicate that the forces along the circumference of the fuel cell 36 stand to reduce to approximately 63 N/mm, a reduction of almost 8 times.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A fuel cell stack comprising:
a first fuel cell assembly and a second fuel cell assembly electrically coupled together, each fuel cell assembly comprising:
a hollow manifold comprising a top wall and a bottom wall, said hollow manifold including a sealed fuel passage for allowing fuel to enter and exit said hollow manifold; and
a fuel cell comprising an anode, a cathode and an electrolyte disposed there between, a portion of one of said top and bottom walls of said hollow manifold forming a side wall in direct contact with said fuel cell such that said fuel cell is coplanar with said hollow manifold;
wherein a portion of one of the top and bottom walls of said hollow manifold extending between said fuel cell and said sealed fuel passage forms a compliant structure to accommodate thermal expansion of said fuel cell in the same plane as said hollow manifold.

2. The fuel cell stack accordingly to claim 1 further comprising a cathode flow channel coupled to said hollow manifold of said first fuel cell assembly and said second fuel cell assembly, said cathode flow channel configured for directing an oxidant between said first fuel cell assembly and said second fuel cell assembly.

3. The fuel cell stack in accordance with claim 1, wherein said at least one hollow manifold for said first fuel cell assembly and said second fuel cell assembly is substantially rectangular.

4. The fuel cell stack in accordance with claim 1, wherein said at least one hollow manifold of said first fuel cell assembly and said second fuel cell assembly further comprises an electrically conductive material.

5. The fuel cell stack according to claim 1, wherein said fuel cell is selected from the group consisting of solid oxide fuel cell, proton exchange membrane fuel cell, molten carbonate fuel cell, phosphoric acid fuel cell, alkaline fuel cell, direct methanol fuel cell, regenerative fuel cell, zinc air fuel cell, and protonic ceramic fuel cell.

6. The fuel cell stack according to claim 1, wherein said fuel cell comprises a solid oxide fuel cell.

7. The fuel cell stack according to claim 1, wherein thermal coefficients of expansion of said fuel cell and said top and bottom walls are different.

8. The fuel cell stack according to claim 1, wherein said fuel cell stack comprises materials of different thermal coefficients of expansion.

9. The fuel cell stack according to claim 1, wherein said fuel cell comprises a ceramic material and each of said top wall and said bottom wall comprises a metal.

10. The fuel cell stack according to claim 1, wherein each of said top wall and said bottom wall are interconnects.

11. The fuel cell stack according to claim 1, wherein each of said top wall and said bottom wall of the hollow manifold acts as an anode interconnect.

12. The fuel cell stack according to claim 1, wherein the compliant structure is located adjacent to said fuel cell and said sealed passage.

13. The fuel cell stack according to claim 1, wherein the compliant structure comprises a corrugated structure.

* * * * *

UNITED STATES PATENT AND TRADEMARK OFFICE
CERTIFICATE OF CORRECTION

PATENT NO.      : 7,632,595 B1                                               Page 1 of 1
APPLICATION NO. : 10/816697
DATED           : December 15, 2009
INVENTOR(S)     : Bourgeois et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Second Day of November, 2010

David J. Kappos
*Director of the United States Patent and Trademark Office*